United States Patent
Bragg

(10) Patent No.: US 11,237,550 B2
(45) Date of Patent: Feb. 1, 2022

(54) ULTRASONIC FLOW METER PROGNOSTICS WITH NEAR REAL-TIME CONDITION BASED UNCERTAINTY ANALYSIS

(71) Applicant: Honeywell International Inc., Morris Plains, NJ (US)

(72) Inventor: Martin Bragg, Carlisle (GB)

(73) Assignee: Honeywell International Inc., Charlotte, NC (US)

(*) Notice: Subject to any disclaimer, the term of this patent is extended or adjusted under 35 U.S.C. 154(b) by 545 days.

(21) Appl. No.: 15/938,735

(22) Filed: Mar. 28, 2018

(65) Prior Publication Data

US 2019/0302752 A1 Oct. 3, 2019

(51) Int. Cl.
*G01F 1/66* (2006.01)
*G05B 23/02* (2006.01)

(52) U.S. Cl.
CPC ..... *G05B 23/0283* (2013.01); *G05B 23/0213* (2013.01); *G05B 23/0297* (2013.01)

(58) Field of Classification Search
CPC ............ G05B 23/0283; G05B 23/0213; G05B 23/0297
See application file for complete search history.

(56) References Cited

U.S. PATENT DOCUMENTS

| 5,657,390 | A | 8/1997 | Elgamal et al. |
| 5,920,856 | A | 7/1999 | Syeda-Mahmood |
| 6,009,474 | A | 12/1999 | Lu et al. |
| 6,029,165 | A | 2/2000 | Gable |
| 6,108,686 | A | 8/2000 | Williams, Jr. |
| 6,202,023 | B1 | 3/2001 | Hancock |

(Continued)

FOREIGN PATENT DOCUMENTS

| DE | 102004030781 A1 | 3/2006 |
| KR | 100708002 B1 | 4/2007 |

(Continued)

OTHER PUBLICATIONS

International Search Report and Written Opinion for PCT Application No. PCT/US2019/024462 dated Jul. 4, 2019. 7 Pages.

(Continued)

*Primary Examiner* — Mohamed Charioui
*Assistant Examiner* — Christine Y Liao
(74) *Attorney, Agent, or Firm* — Ortiz & Lopez, PLLC; Kermit D. Lopez; Luis M. Ortiz

(57) ABSTRACT

A method includes obtaining flow measurement data from a flow meter in an industrial process control system. The method also includes sending the flow measurement data to a cloud-based environment. The method further includes performing condition based monitoring (CBM) analysis on the flow measurement data in the cloud-based environment to determine CBM data. The method also includes performing uncertainty analysis on the CBM data in the cloud-based environment to determine a validated flow rate with an uncertainty value. The method further includes comparing the validated flow rate to the flow measurement data to determine a technically audited flow rate. The method also includes sending the technically audited flow rate to a distributed control system (DCS) associated with the flow meter.

17 Claims, 4 Drawing Sheets

(56) References Cited

U.S. PATENT DOCUMENTS

| | | | |
|---|---|---|---|
| 6,480,896 B1 | 11/2002 | Brown et al. |
| 6,560,656 B1 | 5/2003 | O'Sullivan |
| 6,816,973 B1 | 11/2004 | Gleichauf et al. |
| 7,130,891 B2 | 10/2006 | Bernardin et al. |
| 7,151,966 B1 | 12/2006 | Baier et al. |
| 7,206,286 B2 | 4/2007 | Abraham et al. |
| 7,233,830 B1 | 6/2007 | Callaghan et al. |
| 7,266,417 B2 | 9/2007 | Liao |
| 7,286,897 B2 | 10/2007 | Liu et al. |
| 7,313,447 B2 | 12/2007 | Hsiung et al. |
| 7,343,152 B1 | 3/2008 | Khorram |
| 7,461,403 B1 | 12/2008 | Libenzi et al. |
| 7,548,977 B2 | 6/2009 | Agapi et al. |
| 7,584,274 B2 | 9/2009 | Bond et al. |
| 7,620,986 B1 | 11/2009 | Jagannathan et al. |
| 7,636,764 B1 | 12/2009 | Fein et al. |
| 7,684,876 B2 | 3/2010 | Grgic |
| 7,693,581 B2 | 4/2010 | Callaghan et al. |
| 7,706,310 B2 | 4/2010 | Peng |
| 7,799,273 B2 | 9/2010 | Popp |
| 7,870,106 B1 | 1/2011 | Nguyen et al. |
| 7,873,719 B2 | 1/2011 | Bishop et al. |
| 7,886,065 B1 | 2/2011 | Satish et al. |
| 7,957,335 B2 | 6/2011 | Durazzo et al. |
| 7,970,830 B2 | 6/2011 | Staggs et al. |
| 9,438,628 B2 | 9/2016 | Haridas et al. |
| 10,041,844 B1* | 8/2018 | Brady ............... G01F 1/7044 |
| 2002/0078382 A1 | 6/2002 | Sheikh et al. |
| 2003/0014498 A1 | 1/2003 | Kreidler et al. |
| 2003/0061212 A1 | 3/2003 | Smith et al. |
| 2003/0061481 A1 | 3/2003 | Levine |
| 2003/0088650 A1 | 5/2003 | Fassold et al. |
| 2003/0120778 A1 | 6/2003 | Chaboud et al. |
| 2003/0182359 A1 | 9/2003 | Vorchik et al. |
| 2004/0002943 A1 | 1/2004 | Merrill et al. |
| 2004/0128539 A1 | 7/2004 | Shureih |
| 2004/0153531 A1 | 8/2004 | Gu |
| 2004/0260769 A1 | 12/2004 | Yamamoto |
| 2005/0021594 A1 | 1/2005 | Bernardin et al. |
| 2005/0021705 A1 | 1/2005 | Jurisch |
| 2005/0076245 A1 | 4/2005 | Graham et al. |
| 2005/0195840 A1 | 9/2005 | Krapp et al. |
| 2005/0256735 A1 | 11/2005 | Bayne |
| 2005/0276228 A1 | 12/2005 | Yavatkar et al. |
| 2005/0278441 A1 | 12/2005 | Bond et al. |
| 2006/0004786 A1 | 1/2006 | Chen et al. |
| 2006/0059163 A1 | 3/2006 | Frattura et al. |
| 2006/0085393 A1 | 4/2006 | Modesitt |
| 2006/0155633 A1 | 7/2006 | Fellenstein et al. |
| 2006/0184626 A1 | 8/2006 | Agapi et al. |
| 2006/0230149 A1 | 10/2006 | Jackson |
| 2006/0282876 A1 | 12/2006 | Shelest |
| 2007/0055702 A1 | 3/2007 | Fridella et al. |
| 2007/0074288 A1 | 3/2007 | Chang et al. |
| 2007/0157286 A1 | 7/2007 | Singh et al. |
| 2008/0120414 A1 | 5/2008 | Kushalnagar et al. |
| 2008/0159289 A1 | 7/2008 | Narayanan et al. |
| 2008/0163370 A1 | 7/2008 | Maynard |
| 2008/0208361 A1 | 8/2008 | Grgic |
| 2008/0270162 A1* | 10/2008 | Machacek .......... G05B 23/0221 702/182 |
| 2008/0270523 A1 | 10/2008 | Parmar et al. |
| 2008/0295173 A1 | 11/2008 | Tsvetanov |
| 2009/0058088 A1 | 3/2009 | Pitchford et al. |
| 2009/0125370 A1 | 5/2009 | Blondeau et al. |
| 2009/0132070 A1 | 5/2009 | Ebrom et al. |
| 2009/0172035 A1 | 7/2009 | Lessing et al. |
| 2009/0177289 A1 | 7/2009 | Glanzer et al. |
| 2009/0178108 A1 | 7/2009 | Hudis et al. |
| 2009/0210071 A1 | 8/2009 | Agrusa et al. |
| 2009/0271012 A1 | 10/2009 | Kopka et al. |
| 2009/0300151 A1 | 12/2009 | Friedman et al. |
| 2009/0300210 A1 | 12/2009 | Ferris |
| 2009/0300635 A1 | 12/2009 | Ferris |
| 2010/0022231 A1 | 1/2010 | Heins et al. |
| 2010/0023151 A1 | 1/2010 | Shieh et al. |
| 2010/0042720 A1 | 2/2010 | Stienhans et al. |
| 2010/0107778 A1 | 5/2010 | Henry et al. |
| 2010/0161817 A1 | 6/2010 | Xiao |
| 2010/0256794 A1 | 10/2010 | McLaughlin et al. |
| 2010/0256795 A1 | 10/2010 | McLaughlin et al. |
| 2010/0257227 A1 | 10/2010 | McLaughlin et al. |
| 2010/0257228 A1 | 10/2010 | Staggs et al. |
| 2010/0257605 A1 | 10/2010 | McLaughlin et al. |
| 2011/0214157 A1 | 9/2011 | Korsunsky et al. |
| 2011/0231450 A1 | 9/2011 | Sinha |
| 2012/0174182 A1 | 7/2012 | Neely |
| 2013/0111211 A1 | 5/2013 | Winslow et al. |
| 2014/0007253 A1 | 1/2014 | Hardt |
| 2015/0066163 A1 | 3/2015 | Sunderam |
| 2015/0242182 A1 | 8/2015 | McAdam |
| 2015/0316923 A1 | 11/2015 | Strilich et al. |
| 2016/0098388 A1 | 4/2016 | Blevins et al. |
| 2018/0059629 A1 | 3/2018 | Haridas et al. |
| 2018/0073904 A1* | 3/2018 | Parolini ................. E21B 47/10 |

FOREIGN PATENT DOCUMENTS

| | | |
|---|---|---|
| WO | 2005020179 A1 | 3/2005 |
| WO | 2008088661 A1 | 7/2008 |
| WO | 2009046095 A1 | 4/2009 |
| WO | 2015112463 A1 | 7/2015 |
| WO | 2017196821 A1 | 11/2017 |

OTHER PUBLICATIONS

Croft et al., RFC 951, Internet Engineering Task Force, 1985, pp. 1-12.

Alexander et al., RFC 2132, Internet Engineering Task Force, 1997, pp. 1-34.

International Search Report dated Apr. 28, 2015 in connection with International Patent Application No. PCT/US2015/011937, 5 pages.

Written Opinion of the International Searching Authority dated Apr. 28, 2015 in connection with International Patent Application No. PCT/US2015/011937, 6 pages.

11 Real-Time Data Hosting . . . 11, 2000-2009, 1 page, available at www.industrialevolution.com/ms_services_host.html.

International Search Report and Written Opinion of the International Searching Authority dated Oct. 29, 2010 in connection with International Patent Application No. PCT/US2010/028208, 9 pages.

International Search Report and Written Opinion of the International Searching Authority dated Oct. 29, 2010 in connection with International Patent Application No. PCT/US2010/028218, 10 pages.

International Search Report and Written Opinion of the International Searching Authority dated Oct. 29, 2010 in connection with International Patent Application No. PCT/US2010/028210, 10 pages.

Skonnard, "Why Service Virtualization Matters", Microsoft Services, Mar. 2009, 4 pages.

Castro-Leno et al., "IT and Business Integration through the Convergence of Virtualization, SOA and Distributed Computing," IEEE International Conference on Business Engineering, 2008, pp. 615-620.

"IPsec," Jun. 15, 2014, 10 pages, available at www.wikipedia.org.

Bootstrap Protocol, Mar. 2014, 3 pages, available at www.wikipedia.org.

Communication pursuant to Article 94(3) EPC dated Mar. 15, 2013 in connection with European Patent Application No. 10 764 816.4, 6 pages.

Supplementary European Search Report dated Mar. 4, 2013 in connection with European Patent Application No. EP 10 76 4816, 3 pages.

Wang et al., "Prefetching in World Wide Web", IEEE Global Telecommunications Conference, Nov. 1996, p. 28-32.

Supplementary European Search Report dated Nov. 19, 2012 in connection with European Patent Application No. EP 10 76 4813.1, 6 pages.

Final Office Action dated Feb. 10, 2012 in connection with U.S. Appl. No. 12/416,830, 27 pages.

(56) References Cited

OTHER PUBLICATIONS

International Search Report and Written Opinion of the International Searching Authority dated Nov. 23, 2017 in connection with International Patent Application No. PCT/US2017/046902, 9 pages.
Jegannathan et al., "System and Method for Automatic Logging of Events in Industrial Process Control and Automation System Using Change Point Analysis", U.S. Appl. No. 15/616,019, filed Jun. 7, 2017, 27 pages.
Examination Report for corresponding Indian Application No. 202017038609.

* cited by examiner

ULTRASONIC FLOW METER PROGNOSTICS WITH NEAR REAL-TIME CONDITION BASED UNCERTAINTY ANALYSIS

TECHNICAL FIELD

This disclosure relates generally to industrial process control and automation systems. More specifically, this disclosure relates to a system and method for ultrasonic flow meter prognostics with near real-time condition based uncertainty analysis.

BACKGROUND

Industrial process control and automation systems are often used to automate large and complex industrial processes. These types of systems routinely include various components including sensors, actuators, and controllers. The controllers typically receive measurements from the sensors and generate control signals for the actuators.

Process control and automation systems implemented as distributed control systems (DCS) are designed to control physical components with priorities given to system timing, deployment, availability, impact of failure, and safety. A typical DCS also has requirements to support longer component lifetimes, extensive patch verification and management, and different system operation expertise. These requirements may be implemented to avoid significant risk to the health and safety of human lives, serious damage to the environment, financial issues such as production losses, and negative impact to the economy.

SUMMARY

This disclosure provides a system and method for ultrasonic flow meter prognostics with near real-time condition based uncertainty analysis.

In a first embodiment, a method includes obtaining flow measurement data from a flow meter in an industrial process control system. The method also includes sending the flow measurement data to a cloud-based environment. The method further includes performing condition based monitoring (CBM) analysis on the flow measurement data in the cloud-based environment to determine CBM data. The method also includes performing uncertainty analysis on the CBM data in the cloud-based environment to determine a validated flow rate with an uncertainty value. The method further includes comparing the validated flow rate to the flow measurement data in a technical audit to determine a technically audited flow rate. The method also includes sending the technically audited flow rate to a distributed control system (DCS) associated with the flow meter.

In a second embodiment, a system includes a local environment comprising at least one first processing device and a cloud-based environment comprising at least one second processing device. The at least one first processing device is configured to obtain flow measurement data from a flow meter in an industrial process control system, and send the flow measurement data to the cloud-based environment. The at least one second processing device is configured to perform CBM analysis on the flow measurement data to determine CBM data, and perform uncertainty analysis on the CBM data to determine a validated flow rate with an uncertainty value. The at least one first processing device is further configured to compare the validated flow rate to the flow measurement data in a technical audit to determine a technically audited flow rate, and send the technically audited flow rate to a DCS associated with the flow meter.

In a third embodiment, a non-transitory computer readable medium contains instructions that, when executed by at least one processing device, cause the at least one processing device to obtain flow measurement data from a flow meter in an industrial process control system. The computer readable medium also contains instructions that cause the at least one processing device to send the flow measurement data to a cloud-based environment. The computer readable medium further contains instructions that cause the at least one processing device to perform CBM analysis on the flow measurement data in the cloud-based environment to determine CBM data. The computer readable medium also contains instructions that cause the at least one processing device to perform uncertainty analysis on the CBM data in the cloud-based environment to determine a validated flow rate with an uncertainty value. The computer readable medium further contains instructions that cause the at least one processing device to compare the validated flow rate to the flow measurement data in a technical audit to determine a technically audited flow rate. The computer readable medium also contains instructions that cause the at least one processing device to send the technically audited flow rate to a DCS associated with the flow meter.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures discussed below and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
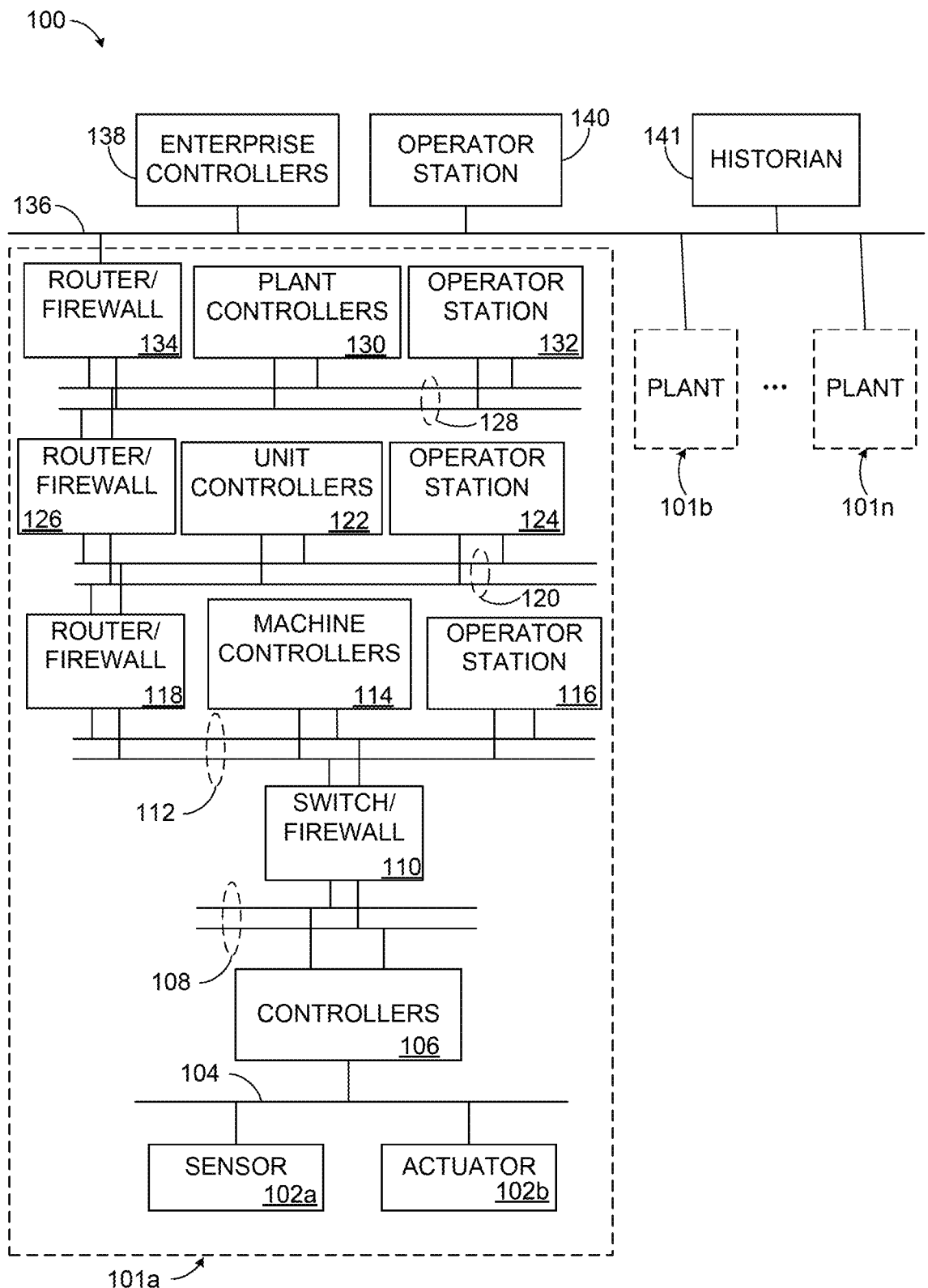
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Multiple controllers 106 could also operate in redundant configurations, such as when one controller 106 operates as a primary controller while another controller 106 operates as a backup controller (which synchronizes with the primary controller and can take over for the primary controller in the event of a fault with the primary controller). Each controller 106 includes any suitable structure for interacting with one or more sensors 102a and controlling one or more actuators 102b. Each controller 106 could, for example, represent a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Additionally or alternatively, each controller 122 could represent a multivariable controller, such as a HONEYWELL C300 controller. Although not shown, different unit-level controllers 122 could be used to control different units in a process system (where each unit is associated with one or more machine-level controllers 114, controllers 106, sensors 102*a*, and actuators 102*b*).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101*a*-101*n*, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101*a*-101*n* and to control various aspects of the plants 101*a*-101*n*. The enterprise-level controllers 138 can also perform various functions to support the operation and control of components in the plants 101*a*-101*n*. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101*a* is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers and operator stations could include one or more processing devices and one or more memories for storing instructions and data used, generated, or collected by the processing device(s). Each of the controllers and operator stations could also include at least one network interface, such as one or more Ethernet interfaces or wireless transceivers.

In particular embodiments, one or more of the sensors 102*a* could represent an ultrasonic flow meter. Ultrasonic flow meters have been in commercial use for a number of decades. In recent years, new type-testing standards were introduced for which flow meter manufacturers have seen mixed results (e.g., pass, partial pass, or failure). Under severe perturbated flow, some flow meters do not satisfy the requirements of the type-testing. Currently, within the global market, there is no near real-time condition based uncertainty analysis for an ultrasonic flow meter. Generally, diagnostics tools are available for a flow meter to determine a current operating state of the flow meter, but no prognostics tools exist that provide a detailed preventative maintenance intervention statement with calculated increasing condition based uncertainty (identifying the specific component of uncertainty). That is, no prognostics tools provide a prediction of the future state of the flow meter based on current or possible future conditions. Moreover, current diagnostics tools typically work on stranded physical assets. There is no dedicated virtual twin representing the physical flow meter for which scenarios modeling, to bring about new learning, can be performed without impacting the physical flow meter.

To address these and other issues, embodiments of this disclosure provide a cloud enabled system that generates data analytics that allow an operator or user to determine a meter's near real-time operational performance, and also generates domain specific analytics to generate prognostics data. The prognostics data provides an operator with information such as, "While the flow meter is working today, operation of the flow meter is likely to change on x date in the future based on possible conditions y and z." The cloud enabled system also provides a virtual twin of the flow meter where testing can be performed in real-time or near real-time. In many cases, it is difficult or impossible to perform diagnostics on a physical meter currently operating in an industrial system. And because many industrial systems are 24/7/365 operations, there is little or no opportunity to take a flow meter out of operation to perform diagnostics. However, it is possible to change a virtual twin of the meter to perform such testing.

This disclosed embodiments provide for meter prognostics, provide a near real-time flow measurement condition based uncertainty analysis for one or more flow meters, and enable a virtual twin of a flow meter for domain specific analytics modelling to simulate the physical meter in a virtual environment. These provide a technical benefit over conventional testing and monitoring systems by enabling prognostics to avoid a meter failure event, and by providing near real-time flow measurement condition based uncertainty, thereby ensuring the best possible accuracy of the device. In addition, the disclosed embodiments enable a greater up-time (i.e., run-time or in-service time) of a flow meter while ensuring the lowest possible measurement condition based uncertainty and the highest quality process recipe.

As described in more detail below, various components in the system 100 could be designed or modified to support the cloud-enabled data analytics system according to this disclosure. For example, one or more of the operator stations 116, 124, 132, 140 or one or more of the controllers 114, 122, 130, 130 could be implemented in a cloud-based environment that communicates with one or more remotely-located controllers 106 or sensors 102a over a virtual private network (VPN) or other secure network.

Although FIG. 1 illustrates one example of an industrial process control and automation system 100, various changes may be made to FIG. 1. For example, the system 100 could include any number of sensors, actuators, controllers, servers, operator stations, networks, and other components. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates one example operational environment in which a cloud-enabled data analytics system can be supported. This functionality can be used in any other suitable system, and the system need not be related to industrial process control and automation.

Figure 2:
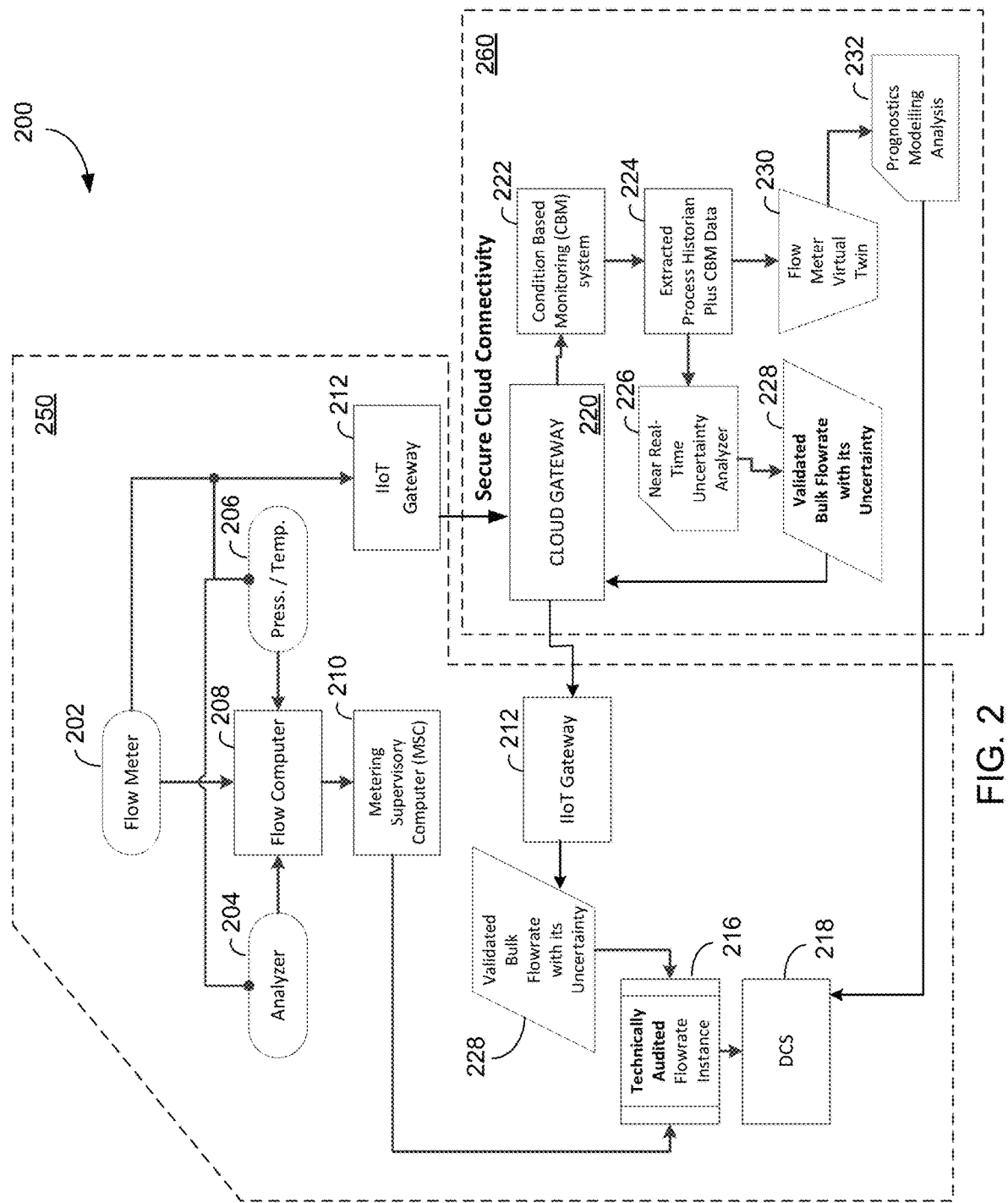
FIG. 2 illustrates an example system that uses a cloud-based control platform for flow meter prognostics and real-time condition based uncertainty analysis according to this disclosure.

FIG. 2 illustrates an example system 200 that uses a cloud-based control platform for flow meter prognostics and real-time condition based uncertainty analysis according to this disclosure. The system 200 includes various components that can be used in conjunction with an industrial process control and automation system, such as the system 100 of FIG. 1. However, the system 200 can be used with any other suitable system or device.

As shown in FIG. 2, the system 200 includes a local environment 250 and a cloud-based environment 260. The local environment 250 includes local (e.g., on-site) components of an industrial process and automation system. For example, the components 202-218 may represent (or be represented by) corresponding components in the system 100 of FIG. 1. The cloud-based environment 260 includes multiple components that can be located remotely from the local environment 250 and can communicate with the local environment 250 over a virtual private network (VPN) or other secure network. One or more of the components of the cloud-based environment 260 can include a computing device configured to perform some of the functions described below. In some embodiments, the computing device(s) of the cloud-based environment 260 could represent (or be represented by) one or more of the components of the system 100, such as the controllers 106, 114, 122, 130, 138; the operations stations 116, 124, 132, 140; or the historian 141.

The flow meter 202 is a ultrasonic flow meter that measures fluid flow in an industrial process. In some embodiments, the fluid is gas, although the fluid may be liquid or a combination of gas and liquid. The flow meter 202 can represent (or be represented by) one or more of the sensors 102a of FIG. 1. In many systems, the flow meter 202 is part of a continuously-running system that is in a live operation state 24 hours/day, 365 days/year. Thus, outside of scheduled maintenance windows, it is a challenge for the flow meter 202 to be in an inactive state.

The analyzer 204 analyzes the constituent components of the fluid that flows through the flow meter 202. That is, in a gas environment, the analyzer is a gas analyzer that determines and analyzes the constituent components of one or more gasses that flow through the flow meter 202. In a liquid environment or a liquid-gas environment, the analyzer could be different and could analyze other components, including liquid components.

The pressure and temperature sensors 206 are sensors that measure pressure and/or temperature of a fluid (gas, liquid, or a combination of the two) in an industrial process. The pressure and temperature sensors 206 can represent (or be represented by) one or more of the sensors 102a of FIG. 1.

The flow computer 208 receives data collected from the flow meter 202, the analyzer 204, and the pressure and temperature sensors 206. The flow computer 208 may also act as a controller for one or more of the flow meter 202, the analyzer 204, and the pressure and temperature sensors 206. The flow computer 208 can represent (or be represented by) one or more of the controllers 106 of FIG. 1. In some systems, there is a flow computer 208 or controller for each flow meter 202.

The metering supervisory computer (MSC) 210 collects and processes data from the flow computer 208 and other flow computers associated with other flow meters in the system 200. The MSC 210 sends information about the flow meter 202 (e.g., bulk flow rate data, etc.) to the DCS 218. In some embodiments, the MSC 210 is a supervisory control and data acquisition (SCADA) device or system. The MSC 210 may represent (or be represented by) one of the higher-level controllers 114, 122, 130, 138 or one of the operation stations 116, 124, 132, 140 of FIG. 1.

The IIoT gateway 212 is a network gateway or router that operates in accordance with Industrial Internet of Things (IIoT) principles or protocols. The IIoT gateway 212 operates as a connection point between the local environment 250 and the cloud-based environment 260. In some embodiments, the IIoT gateway 212 is configured as an edge gateway, which is a virtual router for virtual networks such as a VPN. The IIoT gateway 212 sends flow meter data to, and receives diagnostic, prognostic, and condition based uncertainty data from, the cloud gateway 220. For example, the IIoT gateway 212 can receive validated bulk flow rate information 228 from the cloud gateway 220 and pass the validated bulk flow rate information 228 to a computing device (e.g., the MSC 210) to determine the technically audited flow rate 216 (described in greater detail below), which is then sent to the DCS 218.

The DCS 218 controls operations of the system 200 and other components of the system 200. The DCS 218 receives data from the MSC 210 and the technically audited flow rate 216. Based on the received data, the DCS 218 can provide control instructions to the flow meter 202, the analyzer 204, the pressure and temperature sensors 206, and other components of the system 200.

The cloud-based environment 260 includes a cloud gateway 220. The cloud gateway 220 is used to establish a connection between the local environment 250 and the cloud-based environment 260, and serves as the entry point to the cloud-based environment 260. In the system 200, the cloud gateway 220 receives flow meter data from the IIoT gateway 212 and sends the flow meter data to one or more computing devices in the cloud-based environment 260. The cloud gateway 220 also sends diagnostic, prognostic, and condition based uncertainty data to the IIoT gateway 212. The cloud gateway 220 represents any suitable structure for establishing a connection between a local environment and a cloud-based environment.

The cloud-based environment 260 also includes a condition based monitoring (CBM) system 222. The CBM system 222 performs CBM analysis on the flow meter data received from the local environment 250 through the IIoT gateway 212 and the cloud gateway 220. CBM is a type of predictive maintenance that involves measuring the status of an asset (e.g., a flow meter) over time while it is in operation. The approach to CBM is one based on monitoring a number of variables within an asset where the variable is directly related to one or more technical parameters that have a correlation with the primary output from the asset (e.g., flowrate). For example, a "Signal Performance" variable could be determined as the "Valid Number of Samples" divided by the "Sample Rate" expressed as a percentage. As another example, a "Signal Strength Number" is derived from the inverse of the signal's power generator (i.e., gain control). The inference is that the higher the power the lower the signal strength number and the more challenging the signal's transmission across the measurement media in deriving flowrate.

The collected data can be used to establish trends, predict failure, and calculate remaining life of an asset. Using CBM, it is possible to perform maintenance only when the data shows that performance is decreasing or a failure is likely. Without CBM, preventative maintenance may be performed at specified intervals (sometimes unnecessarily), or may not be performed at all until a failure occurs. The CBM system 222 generates CBM data 224, which may include data extracted from a process historian, such as the historian 141 of FIG. 1. The combination of the CBM data and the historian data enables a subsequent analysis of the asset itself (e.g., flow meter) and its associated localized measurands from n-number of sensors. The sensors provide data that may directly influence the asset, thereby enabling a more thorough real-time uncertainty analysis.

A real-time uncertainty analyzer 226 in the cloud-based environment 260 takes the CBM data 224 and performs real-time uncertainty analysis on the CBM data 224. The analysis of the CBM data 224 provides a mathematical confidence in the performance of the asset itself. To ensure the reliability of this data, the accuracy of the numerical analysis is verified through comparison between the calculated results of the numerical analysis and the actual CBM numerical data. To determine the uncertainty of the bulk output (e.g., flowrate) from the asset requires the additional step of the asset data plus its associated measurands to derive an uncertainty of the actual output (i.e., the resultant condition based uncertainty).

In a flow meter or other industrial instrument, condition based uncertainty analysis relates to assessing the uncertainty in a measurement of the instrument. Generally, device measurements can be affected by errors due to instrumentation, methodology, presence of confounding effects, and the like. Condition based uncertainty analysis provides an estimated confidence in the measurement. For example, for a flow meter, the output of the condition based uncertainty analysis is an uncertainty expression against a flow rate number (e.g., 1605 $m^3$/hour+/−3.2 $m^3$/hour, or can be expressed as a percentage such as 1605 $m^3$/hour+/−0.20%). In the system 200, inputs to the real-time uncertainty analyzer 226 for the uncertainty analysis can include any and all data associated with the flow meter 202, including the flow meter 202 itself, the analyzer 204, the pressure and temperature sensors 206, the flow computer 208, other diagnostics, other measurands, or any combination of two or more of these. The output of the condition based uncertainty analysis in a validated bulk flow rate 228 with an uncertainty value (e.g., 24 $m^3$/sec+/−1 $m^3$/sec). Such a condition based uncertainty value is novel for bulk flow rates. In conventional systems, the only generated data was a bulk flow rate, and it was not known how accurate the number was.

Condition based uncertainty analysis relies on large numbers of highly complex computations and requires substantial computational power, which is one reason why it is advantageous for the real-time uncertainty analyzer 226 to perform the computations in the cloud-based environment 260, away from the physical environment. The cloud-based environment 260 provides a single, powerful computational environment that can be shared among many assets at many sites. This results in a much lower overall cost that providing such a computational environment at each site.

The validated bulk flow rate 228 with condition based uncertainty value is sent to the local environment 250 through the cloud gateway 220 and the IIoT gateway 212. At a computing device in the local environment, a technical audit (e.g., a comparison of values) takes place between the values from the MSC 210 and the validated bulk flow rate 228. If the comparison is good (e.g., the compared numbers are substantially the same—e.g., within 0.3% of each other), then the flow rate is a technically audited flow rate 216 (i.e., it is validated, it is provable). The technically audited flow rate 216 is then passed to the DCS 218. If the comparison is not good (e.g., the compared numbers are not substantially the same), then the data is not technically audited. Such data may be blocked, and a message can be generated that indicates the blocked data.

Once all of the data is collected, processed, and analyzed within the local environment 250 and the cloud-based environment 260, it is not difficult to replicate the flow meter system and associated data in a virtual system for virtual modelling and testing. Performing virtual testing in a virtual system can reveal possible changes that, if made in the physical system, would lead to better results.

Accordingly, the cloud-based environment 260 includes a virtual twin instance 230 of the flow meter 202. The virtual twin instance 230 allows a user (e.g., technician or engineer) to perform virtual modelling and testing that cannot be performed on the physical instance of the flow meter 202. For example, the user can run scenarios in the virtual twin instance 230 that mimic and extrapolate changes that have been observed (or might be likely or possible) in the physical environment. The modeling can yield prognostics data 232 for the flow meter 202. As used herein, prognostics can be defined as "an advance indication of a future event." That is, prognostics allow a user to arrive at a prediction of a future event with some certainty. The prognostics data 232 is the culmination of the condition-based monitoring 222, the condition based uncertainty analysis 226, and the virtual twin 230.

Here again, the cloud-based environment 260 is more suitable for the virtual modeling because the computational power required for the modeling is high and not suitable for installation at every site. Also, prognostics require performing a number of modelling scenarios and advanced analytics that cannot be run on a live physical flow meter.

Figure 3:
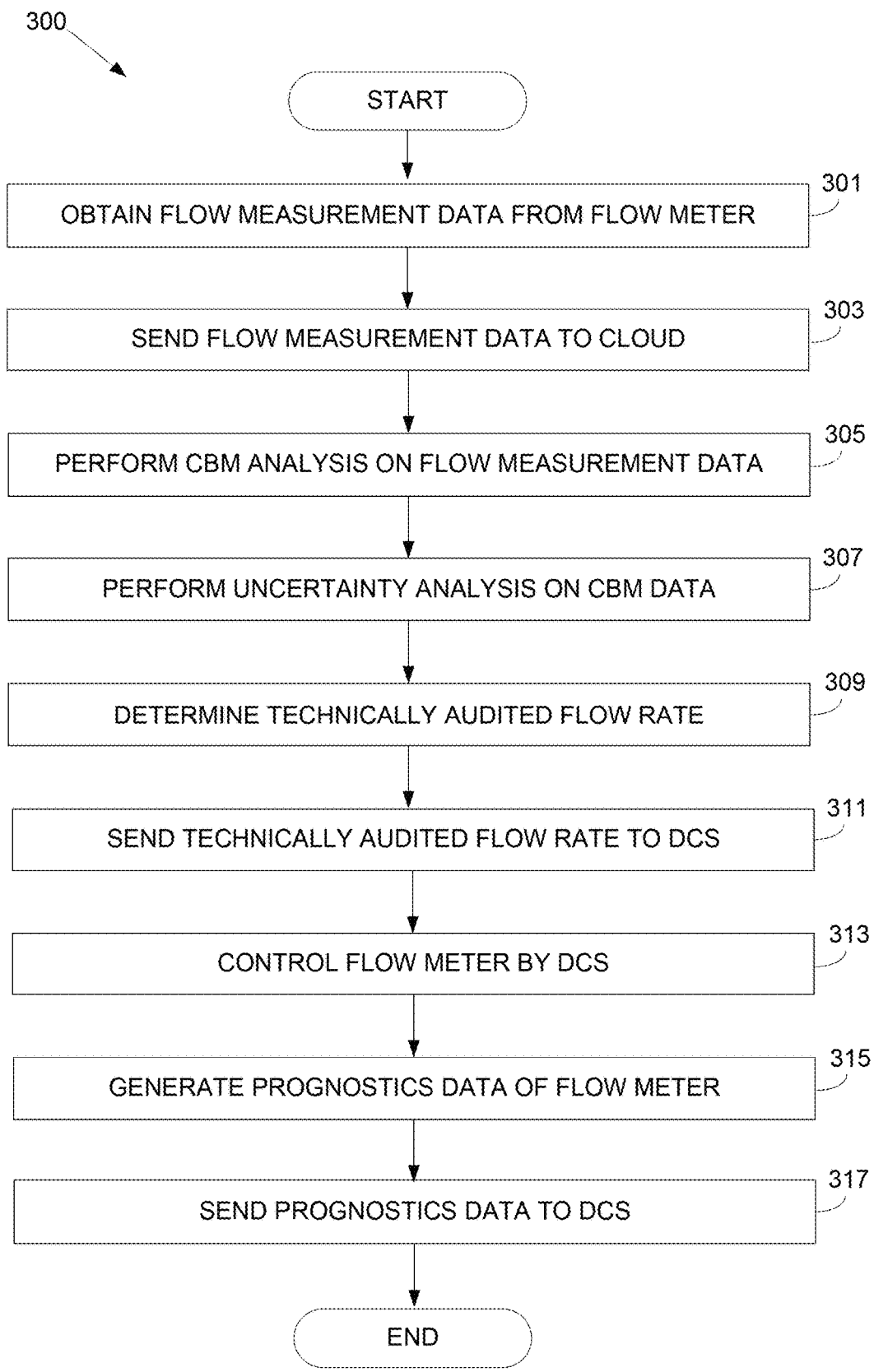
FIG. 3 illustrates an example method for flow meter prognostics and real-time condition based uncertainty analysis according to this disclosure.

FIG. 3 illustrates an example method 300 for flow meter prognostics and real-time condition based uncertainty analysis according to this disclosure. For ease of explanation, the method 300 is described as being performed using the system 200 of FIG. 2. However, the method 300 could be used with any suitable device or system.

At step 301, a computing device obtains flow measurement data from a flow meter in a local environment of an industrial process control system. This could include, for example, the flow computer 208 obtaining flow measurement data from the flow meter 202.

At step 303, a computing device in the local environment sends the flow measurement data to a cloud-based environment. This could include, the flow computer 208 or the MSC 210 sending the flow measurement data to the cloud gateway 220 in the cloud-based environment 260.

At step 305, a computing device in the cloud-based environment performs CBM analysis on the flow measurement data to determine CBM data. This could include, for example, the CBM system 222 performing CBM analysis on the flow measurement data.

At step 307, a computing device in the cloud-based environment performs uncertainty analysis on the CBM data to determine a validated flow rate with an uncertainty value. This could include, for example, the real-time uncertainty analyzer 226 performing uncertainty analysis to determine the validated flow rate 228.

At step 309, a computing device in the local environment compares the validated flow rate to the flow measurement data in a technical audit to determine a technically audited flow rate. This could include, for example, the MSC 210 or another computing device determining the technically audited flow rate 216.

At step 311, a computing device in the local environment sends the technically audited flow rate to a DCS associated with the flow meter. This could include, for example, the MSC 210 sending the technically audited flow rate 216 to the DCS 218.

At step 313, the DCS controls operation of the flow meter based on the technically audited flow rate. This could include, for example, the DCS 218 controlling the flow meter 202 based on the technically audited flow rate 216.

At step 315, a computing device in the cloud-based environment generates prognostics data of the flow meter by performing prognostics analysis using the CBM data and a virtual twin instance of the flow meter. The virtual twin instance of the flow meter is configured with properties the same as the flow meter. This could include, for example, a computing device in the cloud-based environment 260 generating prognostics data 232 using the CBM data 224 and the virtual twin instance 230.

At step 317, the computing device sends the prognostics data of the flow meter to the DCS associated with the flow meter. This could include, for example, a computing device in the cloud-based environment 260 sending the prognostics data 232 to the DCS 218.

Although FIG. 3 illustrates one example of a method 300 for flow meter prognostics and condition based real-time uncertainty analysis, various changes may be made to FIG. 3. For example, while shown as a series of steps, various steps shown in FIG. 3 could overlap, occur in parallel, occur in a different order, or occur multiple times. Moreover, some steps could be combined or removed and additional steps could be added according to particular needs. In addition, while the method 300 is described with respect to the system 200 (which itself was described with respect to an industrial process control and automation system), the method 300 may be used in conjunction with other types of devices and systems.

Figure 4:
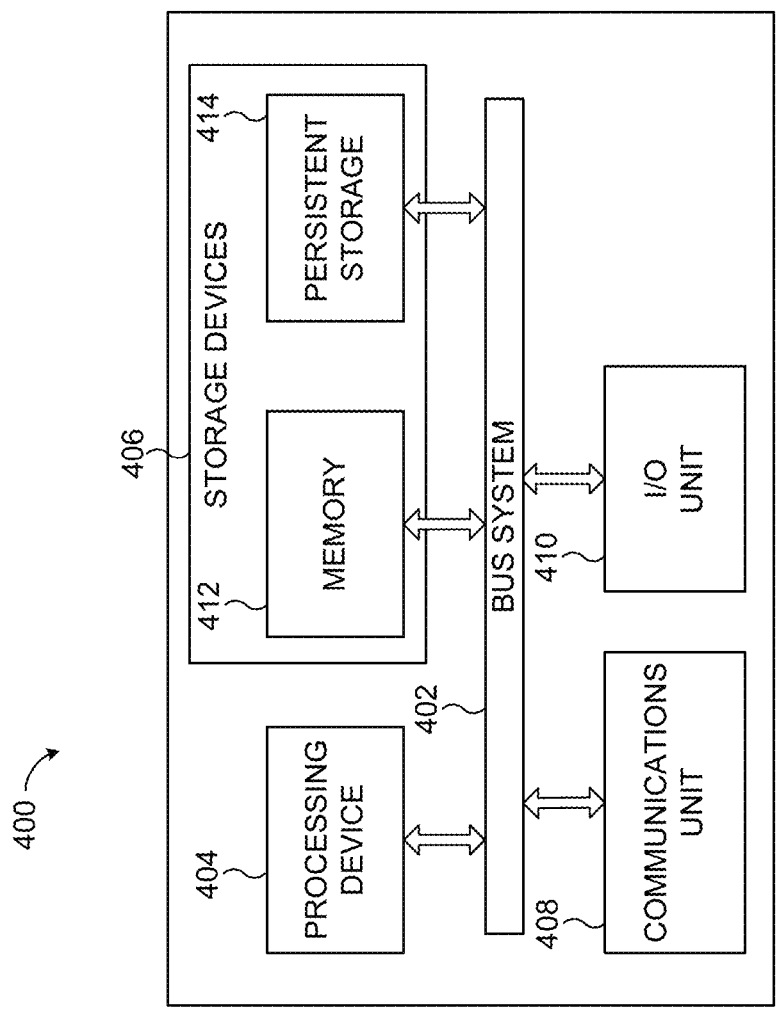
FIG. 4 illustrates an example device for performing functions associated with flow meter prognostics and real-time condition based uncertainty analysis according to this disclosure.

FIG. 4 illustrates an example device 400 for performing functions associated with flow meter prognostics and real-time condition based uncertainty analysis according to this disclosure. The device 400 could, for example, represent the flow computer 208, the MSC 210, the DCS 218, the historian 141, another device shown or described in FIGS. 1 through 3, or a combination of two or more of these. The device 400 could represent any other suitable device for performing functions associated with flow meter prognostics and real-time condition based uncertainty analysis.

As shown in FIG. 4, the device 400 can include a bus system 402, which supports communication between at least one processing device 404, at least one storage device 406, at least one communications unit 408, and at least one input/output (I/O) unit 410. The processing device 404 executes instructions that may be loaded into a memory 412. The processing device 404 may include any suitable number(s) and type(s) of processors or other devices in any suitable arrangement. Example types of processing devices 404 include microprocessors, microcontrollers, digital signal processors, field programmable gate arrays, application specific integrated circuits, and discrete circuitry.

The memory 412 and a persistent storage 414 are examples of storage devices 406, which represent any structure(s) capable of storing and facilitating retrieval of information (such as data, program code, and/or other suitable information on a temporary or permanent basis). The memory 412 may represent a random access memory or any other suitable volatile or non-volatile storage device(s). The persistent storage 414 may contain one or more components or devices supporting longer-term storage of data, such as a read only memory, hard drive, Flash memory, or optical disc. In accordance with this disclosure, the memory 412 and the persistent storage 414 may be configured to store instructions associated with flow meter prognostics and condition based real-time uncertainty analysis.

The communications unit 408 supports communications with other systems, devices, or networks, such as the networks 104, 108, 112, 120, 128, 136. For example, the communications unit 408 could include a network interface that facilitates communications over at least one Ethernet network. The communications unit 408 could also include a wireless transceiver facilitating communications over at least one wireless network. The communications unit 408 may support communications through any suitable physical or wireless communication link(s).

The I/O unit 410 allows for input and output of data. For example, the I/O unit 410 may provide a connection for user input through a keyboard, mouse, keypad, touchscreen, or other suitable input device. The I/O unit 410 may also send output to a display, printer, or other suitable output device.

Although FIG. 4 illustrates one example of a device 400 for performing functions associated with flow meter prognostics and real-time condition based uncertainty analysis, various changes may be made to FIG. 4. For example, various components in FIG. 4 could be combined, further subdivided, or omitted and additional components could be added according to particular needs. Also, computing devices can come in a wide variety of configurations, and FIG. 4 does not limit this disclosure to any particular configuration of device.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc, a digital video disc, or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, e.g., a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
obtaining flow measurement data from a flow meter in an industrial process control system;
sending the flow measurement data to a cloud-based environment;
performing condition based monitoring (CBM) analysis on the flow measurement data in the cloud-based environment to determine CBM data;
performing uncertainty analysis on the CBM data in the cloud-based environment to determine a validated flow rate with an uncertainty value;
comparing the validated flow rate to the flow measurement data to determine a technically audited flow rate;
sending the technically audited flow rate to a distributed control system (DCS) associated with the flow meter;
generating prognostics data of the flow meter in the cloud-based environment by performing prognostics analysis using the CBM data and a virtual twin instance of the flow meter, the virtual twin instance of the flow meter configured with properties that are the same as the flow meter; and
sending the prognostics data of the flow meter to the DCS associated with the flow meter.

2. The method of claim 1, wherein performing the prognostics analysis using the virtual twin instance of the flow meter comprises making changes to one or more properties of the virtual twin instance while the flow meter operates in real-time in the industrial process control system.

3. The method of claim 1, wherein the comparing of the validated flow rate to the flow measurement data is performed by a computing device in a local environment of the flow meter.

4. The method of claim 3, wherein the computing device comprises a metering supervisory computer communicatively coupled to the flow meter.

5. The method of claim 1, further comprising:
controlling operation of the flow meter by the DCS based on the technically audited flow rate.

6. The method of claim 1, wherein the flow measurement data is sent to the cloud-based environment through an Industrial Internet of Things (IIoT) gateway and a cloud gateway.

7. A system comprising:
a local environment comprising at least one first processing device; and
a cloud-based environment comprising at least one second processing device;
wherein the at least one first processing device is configured to:
obtain flow measurement data from a flow meter in an industrial process control system; and
send the flow measurement data to the cloud-based environment;
wherein the at least one second processing device is configured to:
perform condition based monitoring (CBM) analysis on the flow measurement data to determine CBM data; and
perform uncertainty analysis on the CBM data to determine a validated flow rate with an uncertainty value;
wherein the at least one first processing device is further configured to:
compare the validated flow rate to the flow measurement data to determine a technically audited flow rate;
send the technically audited flow rate to a distributed control system (DCS) associated with the flow meter;
generate prognostics data of the flow meter by performing prognostics analysis using the CBM data and a virtual twin instance of the flow meter, the virtual twin instance of the flow meter configured with properties that are the same as the flow meter; and
send the prognostics data of the flow meter to the DCS associated with the flow meter.

8. The system of claim 7, wherein to perform the prognostics analysis using the virtual twin instance of the flow meter, the at least one second processing device is configured to make changes to one or more properties of the virtual twin instance while the flow meter operates in real-time in the industrial process control system.

9. The system of claim 7, wherein the at least one first processing device configured to compare the validated flow rate to the flow measurement data comprises a metering supervisory computer communicatively coupled to the flow meter.

10. The system of claim 7, further comprising the DCS, wherein the DCS is configured to control operation of the flow meter based on the technically audited flow rate.

11. The system of claim 7, wherein the flow measurement data is sent to the cloud-based environment through an Industrial Internet of Things (IIoT) gateway and a cloud gateway.

12. A non-transitory computer readable medium containing instructions that, when executed by at least one processing device, cause the at least one processing device to:
obtain flow measurement data from a flow meter in an industrial process control system;
send the flow measurement data to a cloud-based environment;
perform condition based monitoring (CBM) analysis on the flow measurement data in the cloud-based environment to determine CBM data;
perform uncertainty analysis on the CBM data in the cloud-based environment to determine a validated flow rate with an uncertainty value;
compare the validated flow rate to the flow measurement data to determine a technically audited flow rate;
send the technically audited flow rate to a distributed control system (DCS) associated with the flow meter
generate prognostics data of the flow meter in the cloud-based environment by performing prognostics analysis using the CBM data and a virtual twin instance of the flow meter, the virtual twin instance of the flow meter configured with properties that are the same as the flow meter; and
send the prognostics data of the flow meter to the DCS associated with the flow meter.

13. The non-transitory computer readable medium of claim 12, wherein the instructions to perform the prognostics analysis using the virtual twin instance of the flow meter comprises instructions to make changes to one or more properties of the virtual twin instance while the flow meter operates in real-time in the industrial process control system.

14. The non-transitory computer readable medium of claim 12, wherein the comparing of the validated flow rate to the flow measurement data is performed by a computing device in a local environment of the flow meter.

15. The non-transitory computer readable medium of claim 14, wherein the computing device comprises a metering supervisory computer communicatively coupled to the flow meter.

16. The non-transitory computer readable medium of claim 12, further containing instructions that cause the at least one processing device to:
control operation of the flow meter by the DCS based on the technically audited flow rate.

17. The non-transitory computer readable medium of claim 12, wherein the flow measurement data is sent to the cloud-based environment through an Industrial Internet of Things (IIoT) gateway and a cloud gateway.

* * * * *